Jan. 10, 1956  V. L. CHENEY  2,729,947
APPARATUS FOR PRODUCING LOAVES OF MEAT OR THE LIKE
Filed May 23, 1952
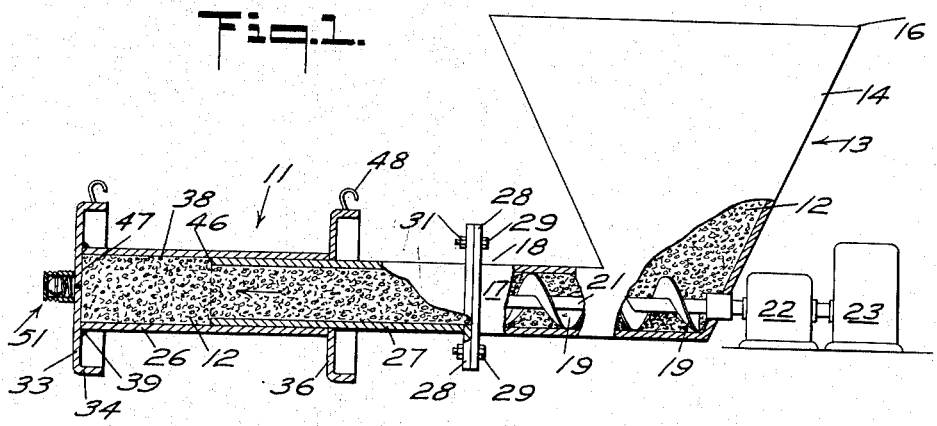
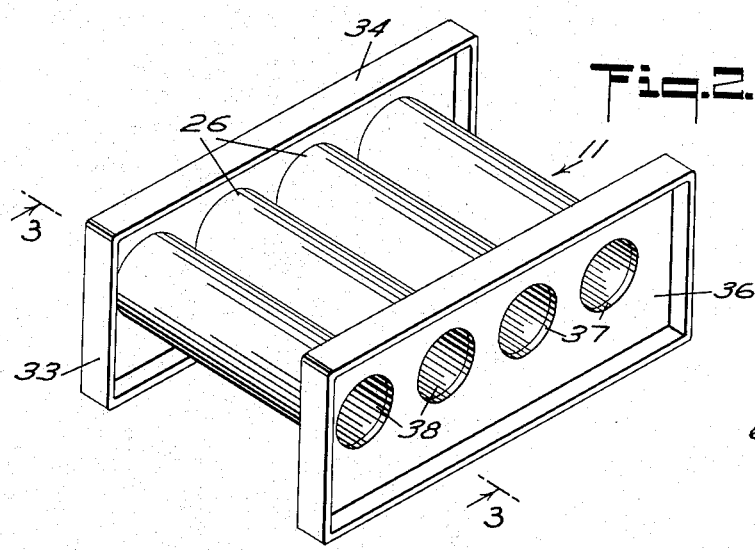
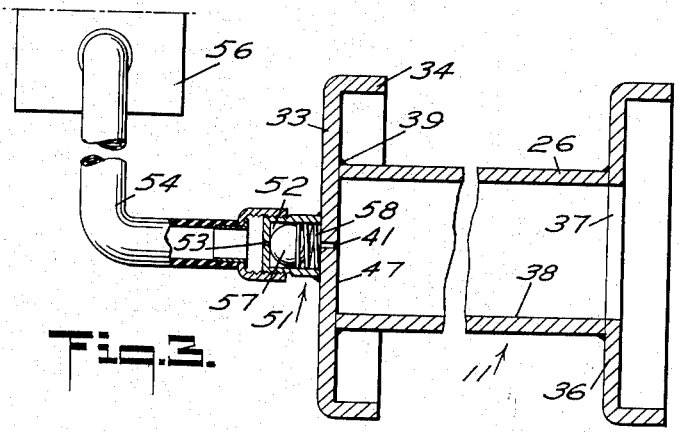
INVENTOR
*Vao L. Cheney*
BY
*Gardner & Zimmerman*
ATTORNEYS

United States Patent Office 2,729,947
Patented Jan. 10, 1956

2,729,947

APPARATUS FOR PRODUCING LOAVES OF MEAT OR THE LIKE

Vao L. Cheney, San Leandro, Calif., assignor to Chip Steak Company, Oakland, Calif., a corporation of California Application May 23, 1952, Serial No. 289,477

3 Claims. (Cl. 62—1)

This invention relates to a method and apparatus for forming fresh meat products, and more particularly, for producing loaves or rolls from a quantity of individual meat particles for subsequent slicing or other operations.

Within a comparatively few years, the purchasing public has enthusiastically accepted and purchased frozen meat products, and particularly, "steaks" which have been produced from pieces of boneless meat preformed into uniform and convenient sizes for cooking. These so-called steaks are produced in a number of different ways, but in general, are constructed by first slicing pieces of meat from the beef carcass, compressing the meat pieces into individual loaves or rolls, and finally cutting slices from such loaves to produce the individual steaks. Heretofore, numerous difficulties have been encountered in producing the loaves, and numerous complex and expensive mechanisms have been developed in an effort to provide a suitable mold which will permit freezing of the molded loaf while still permitting ready removal of the loaf from the mold.

Accordingly, it is an object of the present invention to provide an improved method for producing meat loaves in which compressed loaves of frozen meat pieces may be readily produced.

Another object of my invention is to provide a simple and inexpensive method for producing meat loaves which materially reduces the possibility of air pockets or voids within the loaf mass.

A further object of the invention is to provide a process for removing a generally solidified meat loaf from a core mold without deleterious effects on the loaf or the mold.

A still further object of the present invention is to provide a mold for producing meat loaves which is simple to manufacture and which is not required to be subjected to the physical abuse normally encountered by previously utilized loaf molds.

Yet another object of the invention is to provide a loaf mold of the character described which will permit normal expansion of the meat loaf as the latter is frozen without imparting any undue strain on the mold.

Still another object of my invention is to provide a mold of the above referred to character in which means are provided for forcibly removing the molded loaf therefrom without necessitating any opening of the mold.

Another object of this invention is to provide a method and apparatus for producing meat loaves in which the loaf possesses improved weight consistency and in which uniformly thick slices will all contain substantial identical weights of meat.

The invention possesses other objects and features of advantage which, together with the foregoing, will be specifically set forth in the following description of the invention. It will be understood that the invention is not to be limited to the exemplary apparatus or the specific process and method herein shown and described, as variations thereof may be employed which come within the scope of the appended claims.

In the drawing:

Figure 1 is a side elevational view, partly in section, of my new mold, shown in operative position on a meat feed mechanism.

Figure 2 is a perspective view of a plurality of individual molds mounted in a preferred form of the invention.

Figure 3 is an enlarged sectional view taken substantially in the plane indicated by the numerals 3—3 of Figure 2.

Figure 4 is a sectional view showing a mold as the meat is being frozen therein.

In the manufacture of pre-packaged steaks of the type hereinabove mentioned, the individual meat pieces are usually placed into a generally cylindrical mold, compressed therein, frozen, removed from the mold, and sliced. Although this seems to be a comparatively simple matter, with the molds and methods heretofore utilized, severe difficulties were encountered in insuring uniformity throughout the meat mass and permitting withdrawal of the loaves from the molds without injuring the molds or the loaves formed therein. By means of the present invention, I have provided a process apparatus for preparing meat loaves which overcome the foregoing difficulties.

Broadly speaking, my process comprises the introduction of meat particles adjacent the closed end of a cylindrical mold, continuing the feeding of such material while axially moving apart the mold and meat feed mechanism, stopping the feed before the meat reaches the open end of the mold, freezing the meat in the mold to produce a substantially solidified meat core, and blowing the core out from the mold for slicing or other operations. It is believed clear that by practicing such a method, a simple mold may be used, and, due to method of meat feed, a uniform consistency will be present throughout the finished core or loaf.

Further details of my method will become apparent during the following discussion of the exemplary apparatus.

The mold of the present invention, generally designated by the numeral 11, is shown in Figure 1 in operative position for receiving a quantity of sliced, ground or chopped meat 12 from a meat fed mechanism 13. It is not necessary to have the meat pieces of any particular size so long as they are sufficiently small that they may be forced into the mold cylinder as will be hereinafter explained. This feed mechanism includes a vertically extending hopper 14 arranged to receive a quantity of meat through an open top 16 and discharge the same into a horizontally extending conduit 17. Means are provided in said conduit for forcibly urging the meat from the hopper discharge to the terminal end 18 of the conduit, and, as here shown, such means include a helical screw conveyor 19 mounted on a shaft 21 which may be driven by a motor 22 through any suitable clutch mechanism 23. As will be understood, by engaging or disengaging the clutch, and hence the rotation of the conveyor, meat will be selectively advanced towards conduit end 18 or stopped, for a purpose presently to be described.

The individual cylinders 26 of mold 11 are arranged to be sequentially aligned with the conduit 17 for receiving meat therefrom. If desired, conduit 17 could be of a size permitting telescopic entry into cylinder 26, but as here shown, an intermediate feed conduit 27 is secured to the discharge end of conduit 17, and is designed to enter the mold cylinders 26 as shown in Figure 1. To secure the conduits in axial alignment, each is provided with a flange 28 provided with suitable registering apertures through which bolts 29 may pass, with nuts 31 locking the flanges together.

Each mold may simply comprise a single cylinder 26, but for reasons of greater productivity, I prefer to incorporate a plurality of cylinders on each mold. As will be best seen in Figures 2 and 3, the mold 11 includes a rigid back plate 33 having a forwardly extending peripheral flange 34. A front plate 36 is disposed in parallel spaced relation to back plate 33 and is provided with openings 37 of a diameter substantially equal to that of the cylinder bore 38 and in axial alignment therewith. The cylinders 26 may be welded or soldered to the respective plates as indicated at 39 or otherwise secured thereto to provide a generally integral structure. It will also be noted that small apertures 41 are formed in the back plate in axial alignment with each cylinder bore for a purpose to be hereinafter described.

In filling the mold cylinders with meat 12, I prefer to utilize the following procedure. An empty cylinder is manually or otherwise telescopically inserted over conduit 27 until the discharge end 46 of the latter is disposed immediately adjacent the inner surface 47 of back plate 33. Motor 22 may then be actuated which causes meat to be forcibly extruded through the conduit discharge 46 into the mold cylinder. To eliminate the possibility of voids or air spaces from being present in the finished loaf, the conduit has an outer diameter permitting only a slide fit within the mold, and at the same time, the mold is preferably partially restrained by pushing the same axially towards conduit 27. Thus, as meat is forced into the mold cylinder, the meat pressure will work against the back plate and the restraining force and actually force the mold from the feed conduit. In practice, the molds may be provided with one or more hooks 48 whereby the sling of an overhead crane will support the same in substantial horizontal alignment, and the mold operator need only apply manual body pressure against the mold to affect the necessary restraining force against undesirable rapid axial separation between the feed conduit and mold cylinder. For a reason about to be explained, the screw feed is halted prior to complete filling of the cylinder so as to leave a space between the end of the meat in the cylinder and front plate 36. No particular description of the clutch mechanism is deemed necessary for no particular clutch arrangement is required and in any event forms no independent part of my invention.

After all of the mold cylinders have been filled, the molds are placed under sufficient refrigeration to cause a freezing of the meat core therein. As the meat freezes, some expansion takes place, and due to the closed rear end and confining peripheral portions of the cylinder, the expansion will take place towards front plate 36, and it is for this reason that the cylinder is not completely filled with meat. During the process of freezing, the outer portions of the meat loaf or core will be first solidified, and particularly a frozen disc of meat will be produced adjacent the open end of the mold cylinder. However, as the freezing continues this disc may be deformed in any one of a number of ways and thus render the end of the meat loaf unsuitable for slicing operations, therefore, as shown in Figure 4 I prefer to place the mold under refrigeration in a vertical position with the open end of the cylinder upwardly. I then place a cylindrical weight 61 in the open end of the cylinder which will result in a more uniform expansion of the meat core and provide the same with a flat end portion. The weight may be provided with a handle 62 to facilitate its insertion and removal from the mold cylinder. By way of example only, if the cylinder has a 5½" diameter, the weight should be in the neighborhood of ten pounds.

As will be understood, the core or meat loaf must be removed from the mold before the same may be sliced or otherwise processed, and in the connection, novel means are provided for effecting such removal. Referring to Figure 3 of the drawing, it will be seen that air fittings 51 are secured to the rear surface of back plate 33, the fittings being provided with chambers 52 in communication with each of the plate apertures 41. The rear face of fitting 51 is provided with an aperture 53 through which compressed air may be introduced from an air hose 54 connected to a suitable source of compressed air, such as a compressor 56. Aperture 53 is normally covered by a ball 57 which is urged against such aperture by a spring 58. As will be understood, when compressed air is introduced to the aperture, the ball will be forced away from aperture 53 and air will enter the rear end of cylinder 26 and actually push or extrude the meat core through the open end 37 of the mold cylinder. This pneumatic action will neither injure the mold nor deleteriously affect the meat loaf.

In view of the fact that the meat has been frozen in the mold, it will come out in a substantially solidified loaf. However, due to the tendency of the outer peripheral surface of the loaf to freeze to the inner walls of the cylinder, I prefer to immerse the mold in warm water prior to forcing air into the same. This will result in the outer periphery of the loaf loosening from the cylinder and permitting the same to be readily extruded from the mold.

From the foregoing explanation, it is believed clear that I have provided a simple inexpensive process and apparatus for producing compact and uniform meat loaves.

I claim:
1. Mold apparatus comprising an axially extending rigid casing having an axially extending bore, a closure plate overlying and secured to one end of said casing and extending laterally beyond said casing to provide a generally continuous flange, said closure plate being provided with an aperture in axial alignment with and substantially smaller than said casing bore, an air valve mounted on said plate and having a chamber in communication with said aperture whereby compressed air may be introduced into said casing bore through said chamber and aperture, and a front plate substantially coterminous with said closure plate secured to the other end of said casing, said front plate having a bore therein axially aligned with and of substantially the same size as said casing bore.

2. Apparatus of the character described comprising a vertically disposed rigid casing having a closed bottom provided with a small axially disposed aperture therein and an open top, an air valve member mounted on said closed end and extending axially from said casing, means in said valve member permitting introduction of compressed air from exteriorly of said casing into said casing through said aperture, and a weight member axially slidable in said casing, said weight member substantially filling the cross-sectional area of said casing and having a generally flat bottom surface to engage and bear against material placed in said casing.

3. Mold apparatus comprising a plurality of axially parallel longitudinally extending rigid casings, each of said casings being provided with an axially extending bore, means defining a substantially imperforate closure plate at one end of each of said bores, means for securing end portions of said casings to said plate, said plate being provided with a plurality of apertures in axial alignment with each bore with the diameter of each aperture substantially less than the diameter of said bores, and an independent air valve mechanism mounted in each of said apertures.

References Cited in the file of this patent
UNITED STATES PATENTS

| | | |
|---|---|---|
| 1,579,437 | Corbett | Apr. 6, 1926 |
| 1,964,010 | Vogt | June 26, 1934 |
| 1,964,011 | Vogt | June 26, 1934 |
| 2,011,989 | Vogt | Aug. 20, 1935 |
| 2,013,610 | Karpiloff | Sept. 3, 1935 |
| 2,132,879 | Pownall | Oct. 11, 1938 |
| 2,579,931 | Klein | Dec. 25, 1951 |

FOREIGN PATENTS

| | | |
|---|---|---|
| 661,753 | Germany | June 2, 1938 |